Sept. 23, 1958        A. BENZ        2,852,873
WHEELED SHOVEL
Filed Feb. 3, 1956
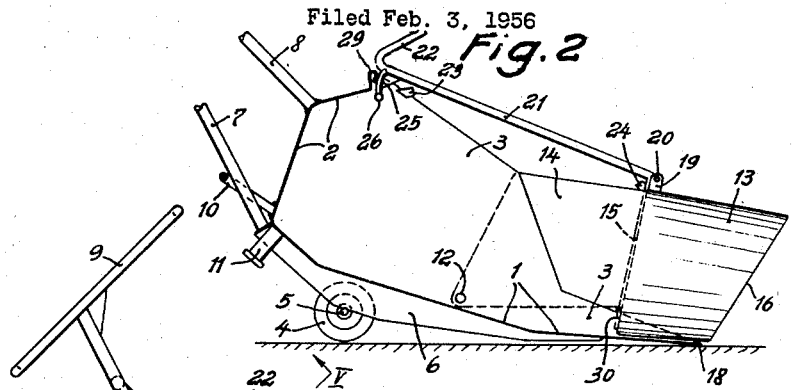
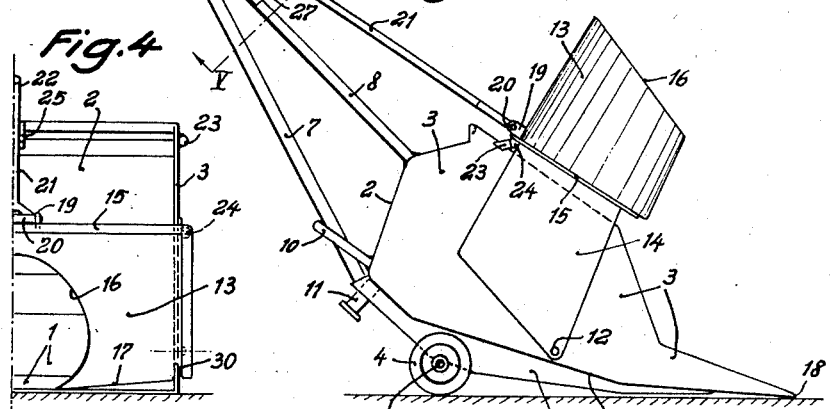
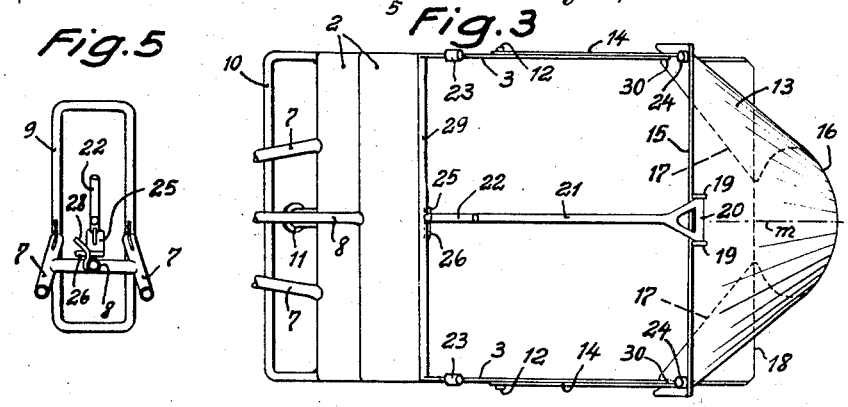
INVENTOR:
AUGUST BENZ United States Patent Office 2,852,873
Patented Sept. 23, 1958

2,852,873

WHEELED SHOVEL

August Benz, Schlieren, Switzerland

Application February 3, 1956, Serial No. 563,342

Claims priority, application Switzerland February 7, 1955

6 Claims. (Cl. 37—130)

The present invention concerns a wheeled carrier or shovel.

Wheeled shovels are known, in which the shovel blade provided with a hood is designed as a container which is open at the front and at the top and fitted with wheels to facilitate moving the container against comparatively slight resistance into any loose material and to move it away in the manner of a manually operated vehicle.

The present invention has for one of its objects to provide means affording the construction of a very efficient wheeled shovel which is distinguished from known shovels of the type in that it is equipped with a funnel permitting loose material to be emptied into a charging opening formed in the bottom, which opening is smaller than the mouth of the shovel, the funnel being adapted to be lifted when filling the shovel, and to be lowered onto the fore-part thereof when the shovel is being emptied.

The funnel joins preferably with its mouth to the front edge of the shovel and is open at the end adjacent to the shovel bottom so as not to hinder in any way the bringing of the loose material into the funnel.

The shovel with funnel is above all intended for charging heating plants of school, industrial and business buildings, hotels, etc., in which the charging opening is formed in the bottom of a coal bunker located above the heating plant.

When emptying the shovel through the charging opening in the bottom, the coal will be conducted into the charging opening by the funnel without dust being raised.

Linked to the funnel is preferably an operating rod adapted to enable adjustment of the funnel in its position for use and out-of-use without having to release the handle of the shovel. On the shovel and operating rod of the funnel provision may be made for arresting means adapted to lock the funnel in its end positions.

The accompanying drawing shows by way of example one embodiment of the invention.

Fig. 1 is a lateral view of the wheeled shovel with funnel in raised position of non-use;

Fig. 2 shows the wheeled shovel with the funnel lowered into the position of use;

Fig. 3 is a top plan view of the wheeled shovel with lowered funnel;

Fig. 4 is a fragmentary front elevational view of the wheeled shovel with lowered funnel, and Fig. 5 is a sectional view taken on the line V—V of Fig. 1.

Referring now more specifically to the drawing, there is disclosed and shown a wheeled shovel which comprises a body traveling on rollers 4 and consisting of the shovel bottom 1, the shovel rear wall 2 and the side walls 3. The axle 5 of the rollers is mounted on two longitudinal stiffening ribs 6 adjacent the shovel bottom. Two rods or booms 7, 8 are welded with their ends to the rear end of the shovel and carry at their forward ends the handle 9 which forms a rectangular frame and is situated transversely to the booms. 10 denotes a rearwardly projecting pedal stirrup attached beneath the shovel body and by which pushing of the shovel into the loose material may be assisted with the operator's foot. 11 is a supporting foot onto which the loaded shovel can be lowered, whereby the knocking of this foot on the ground will cause the loose material in the shovel to be moved to the rear. At the bottom of the two side walls 3, substantially in the longitudinal median line thereof, two pivot pins 12 are welded-on, having swivably mounted thereon the funnel 13 with its lateral guide walls 14. The funnel 13 has at the rear end a rectangular opening conformed to the width of the shovel mouth and bounded by an U-shaped stiffening frame 15, and has in front a substantially arcuate opening 16 which, with funnel lowered, joins below with its rim to the mouth edge 18 of the shovel (Fig. 3). At its end adjacent to the shovel bottom 1, the funnel is open and its longitudinal edges 17 lying on the shovel bottom extend from the side walls 3 of the shovel obliquely forwards towards the middle line of the shovel bottom. The edge 16 of the mouth of the funnel starts at the points of intersection of the longitudinal edges 17 with the front edge 18 of the shovel. At the top, in the middle of the stiffening frame 15 of the funnel, an operating rod 21 is pivotally mounted on two welded-on bearing lugs 19, by means of an axle piece 20, the rear end of said rod being bent up hook-shaped, to serve as gripping handle 22. By means of this operating rod, the funnel, without releasing the shovel held with one hand, can be raised with the other hand and brought into its position of use. The limit of the swivelling movement of the funnel 13 into its position of use will be reached when the longitudinal edges 17 thereof abut on the shovel bottom 1, while the limit of the swivelling movement of the funnel into its raised position is attained when the two stops 23 on the side walls of the shovel are met by two counterstops 24 disposed at the top on the corners of the stiffening frame 15 of the funnel. The arrestment of the funnel in its two end positions is effected by a downwardly extending lug 25 welded to the end of the operating rod 21, and by a laterally projecting arresting pin 26 attached to the end of said lug. Said pin 26 serves for locking the funnel when out of use; it cooperates with an arresting notch 27 formed on the plate 28 welded to the boom 8. With funnel 13 in raised position, the pin 26 can engage the notch 27, thus securing the funnel in its out-of-use position. The funnel is locked in the lowered position by the lug 25 which cooperates with the edge of the rear wall 2, strengthened by a bead 29. With raised funnel and by depressing the handle 22, the lug 25 becomes clamped behind the bead 29, whereby the funnel is supported in its position of use. At the bottom of the funnel sides at the point connecting with the guide plates 14, provision is made for cut-outs 30 into which the front portions of the side walls 3 of the shovel can engage.

When filling the shovel, by guiding same with both hands on handle 9 and pushing it with the foot on the pedal stirrup 10 into any loose granular material, good filling thereof will be ensured upon two subsequent jerks. The loose material brought onto the shovel will be thrown to the rear space thereof by letting the supporting foot 11 knock against the ground, whereupon the funnel is lowered, secured and the implement carried to the charging opening of the heating plant. The shovel is emptied through the charging opening by tilting it about its front edge 18.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A wheeled shovel comprising a shovel body having opposite side walls, a bottom therebetween, and a top, said bottom terminating in a forward end for receiving material, a funnel mounted adjacent said bottom for swivel movement from a lowered position adjacent said forward end toward a raised position adjacent said top of said shovel body, said funnel having an open front end and being provided with two spaced longitudinal edges converging from the side walls of said shovel body forwardly thereof toward said open front end.

2. A wheeled shovel according to claim 1, the front end of said funnel being arcuately shaped and terminating substantially coextensive with the forward end of said shovel body, the rear end of said funnel being provided with a frame substantially conformed to the width of the bottom of the shovel.

3. A wheeled shovel according to claim 2, including means extending centrally of and connected with said funnel rearwardly thereof to thereby actuate said funnel for said swivel movement from said position adjacent the forward end of said shovel body toward the top of the latter, and guide plates connected to said funnel and swivelling relative to said shovel body in unison with said funnel.

4. A shovel according to claim 1, including rod means terminating in a handle and operatively connected to said funnel, and respective means attached to said shovel body to engage said rod means with said handle in said lowered and raised positions of said funnel respectively, and to thereby retain the latter in either of said positions.

5. A shovel according to claim 1, including respective stop means on said funnel and said shovel body, said stop means being engaged with each other in at least one of said positions in the course of said swivel movement of said funnel.

6. The combination, with a tiltable shovel body having a bottom with a deepened rear portion and a substantially flat forward portion for engaging material to be shoveled, of a funnel hinged to said shovel body to thereby assume two extreme positions, in one of said extreme positions said funnel being located in engagement with said forward portion of said bottom for directing and discharging material from said deepened rear portion of said shovel body therewithout, in the other of said positions said funnel being swung on top of said shovel body to facilitate receiving of material at the forward portion of said bottom.

References Cited in the file of this patent

UNITED STATES PATENTS

| | | |
|---|---|---|
| 1,804,404 | Dowling | May 12, 1931 |
| 2,544,505 | Kronhaus | Mar. 6, 1951 |
| 2,662,312 | Kadz | Dec. 15, 1953 |
| 2,764,450 | Rosener | Sept. 25, 1956 |